Patented July 23, 1935

2,009,064

UNITED STATES PATENT OFFICE 2,009,064

PROCESS OF PREPARING AMINO DERIVATIVES OF POLYCYCLIC ORGANIC COMPOUNDS

Walter Mieg, Opladen, Rudolf M. Heidenreich, Leverkusen-I. G. Werk, and Heinrich Neresheimer, Ludwigshafen, Germany, assignors to General Aniline Works, Inc., New York, N. Y., a corporation of Delaware No Drawing. Application July 11, 1933, Serial No 679,988. In Germany July 15, 1932

9 Claims. (Cl. 260—60)

The present invention relates to a process of preparing amino derivatives of polycyclic organic compounds.

In accordance with the invention amino derivatives of polycyclic organic compounds are obtained by reacting upon a pyridinium halogenide having attached to the nitrogen atom a radical of a polycyclic organic compound, more particularly one containing at least three nuclei, with an alkaline reacting agent other than a tertiary heterocyclic base, such as methylamine, ethylamine, aniline, toluidines, xylidines, methylaniline, ethylaniline, piperidine, cyclohexylamine or other primary or secondary amines, ammonia, alkali metal hydroxides, alkali metal carbonates or -bicarbonates etc.

The inorganic alkaline reacting agents are advantageously applied in an aqueous medium. Likewise, the piperidine or other organic bases miscible with water are advantageously applied in admixture with the latter. Alcoholic solutions of the alkaline reacting agents or solutions of the same in other inert organic solvents are also operable, furthermore, the treatment of the pyridinium derivatives with alkaline hydrosulfite solutions is often of advantage.

The reaction performs generally already at normal temperature. Heating of the reaction mixture strongly accelerates the reaction, and, therefore, it is desirable in nearly all cases to work at an elevated temperature. Preferred temperature ranges are those between about 40-50° C. and about 200° C.

The reaction products thus obtainable vary in their constitution depending on the more detailed method of working. Generally, mild reaction conditions (weak alkaline agents and/or low temperatures or short time of reaction) tend to the formation of compounds still containing the same number of carbon atoms as the starting materials. On the other hand, stronger reaction conditions tend to the formation of compounds in which the pyridinium residues of the starting materials have been replaced by amino groups.

The reactions involved in these processes are probably characterized by the following scheme:—

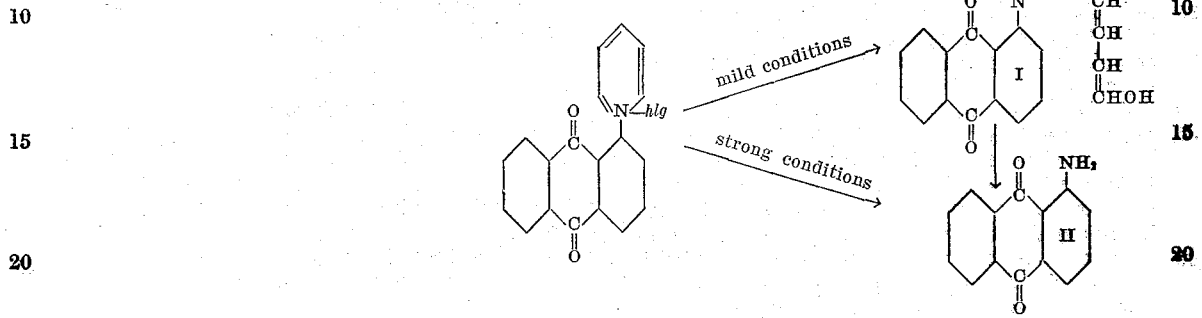

Compounds of the type I are, for example, obtainable while applying dilute caustic soda solutions at a temperature not substantially surmounting about 50° C., or while applying aqueous sodium- or potassium carbonate or -bicarbonate solutions at temperatures up to the boiling point of the reaction mixtures. However, it is impossible to give exact limitations of the reaction conditions at which the one or the other type of the compounds is formed.

As suitable starting materials for performing our process there may be mentioned by way of example anthraquinone-1-pyridinium chloride or -bromide, anthraquinone-2-pyridinium-chloride, anthraquinone-1,5- or -2,6-dipyridinium dichloride, 1-aminoanthraquinone-4-pyridinium chloride, 1,5 - diaminoanthraquinone - 4 - pyridinium chloride, anthraquinone-2-carboxylic acid, 1-pyridinium chloride, quinizarine-2-pyridinium bromide, Bz-1-benzanthronyl-pyridinium chloride or -bromide, anthanthronyl-2,7-dipyridinium dichloride or -dibromide, an thracene-9-chloro-10-pyridinium chloride, furthermore, the pyridinium compounds of, for example, substituted or unsubstituted indanthrones, dibenzopyrene quinones, indigoid dyestuffs etc.

The pyridinium derivatives of polycyclic organic compounds used as starting materials for the manufacture of amino derivatives as disclosed above, may be obtained in various ways. For example, polycyclic organic compounds, containing loosely bound halogen atoms, such as 1- bromoanthraquinone - 2 - aldehyde, 1-bromo-4-nitroanthraquinone- 1 -chloroanthraquinone- 2 - carboxylic acid, Bz-chloro-N-methylanthrapyridone, 1 - chloro-acetyl-methylaminoanthraquinone, may be heated with pyridine, advantageously to the boil, whereby the pyridinium derivatives separate from the reaction mixture. According to another method pyridinium derivatives of polycyclic organic compounds in which the halogen does not react with boiling pyridine, may be heated with pyridine in the presence of a metal halogenide exerting a condensing reaction, such as anhydrous aluminium chloride, anhydrous ferric chloride, anhydrous zinc chloride etc., the metal halogenide being advantageously applied in an amount of at least one molecular proportion on each halogen atom to be replaced by the pyridinium residue. Preferred temperature ranges for performing this reaction are those between about 100 and about 300° C. In this manner, for example, 1-chloroanthraquinone, 2-chloroanthraquinone, 1,5-dichloroanthraquinone, 2,6-dichloro-anthraquinone, 1,3-dibromoanthraquinone, 1-amino-2-bromoanthraquinone, Bz-1-bromo-benzanthrone, 2,7-dibromoanthanthrone, 9,10-dichloroanthracene, 5,7,5′,7′-tetrabromoindigo, 5-bromoindole-2,2′-thionaphtheneindigo, 1-amino-4-chloro-anthraquinone, 1-amino-2,4-dibromoanthraquinone, 4,4′-dibromo-1,1′-dianthraquinonylamine, 1-amino-4-bromoanthraquinone- 2 -sulfonic acid etc. may be easily transformed into the corresponding mono-, di- or polypyridinium derivatives.

A third process of preparing the pyridinium derivatives in question is by heating an alpha-aminoanthraquinone having a free para-position to the amino group with pyridine in the presence of a compound having a condensing reaction and being capable of introducing halogen into amino anthraquinones or their nuclear or N-substitution products, such as ferric halogenides, antimony pentachloride etc., advantageously in the presence of a catalyst known to facilitate the entrance of halogen atoms into aromatic nuclei, such as selenium, sulfur or iodine. Suitable temperature ranges for performing this reaction are those between about 150 and about 300° C. In this manner, for example, 1-aminoanthraquinone-4-pyridinium chloride or -bromide may be prepared from 1-aminoanthraquinone, furthermore, 1,5-diamino-4-pyridinium chloride or -4,8-dipyridinium dichloride from 1,5-diaminoanthraquinone, 1 - methyl - amino-4-pyridinium chloride from 1-methylaminoanthraquinone, 1-benzoylaminoanthraquinone-4-pyridinium chloride from 1-benzoylaminoanthraquinone, 1,8-diaminoanthraquinone-4-pyridinium chloride from 1,8-diaminoanthraquinone etc.

The following examples illustrate the invention, without limiting it thereto, the parts being by weight:—

Example 1

10 parts of anthraquinone-1-pyridinium chloride are introduced into 50 parts of aniline and the mixture is heated to boiling for 10 minutes. After cooling, the 1-aminoanthraquinone being formed separates in a good state of purity.

Instead of aniline ortho- or para-toluidine, methylaniline or a mixture of pyridine and an aqueous methylamine solution may be applied.

Example 2

5 parts of anthraquinone-2-pyridinium chloride are heated in a mixture of 10 parts of sodium hydrosulfite and 200 parts of a 5% aqueous caustic soda solution to a temperature of 50° C. for a short time. The 2-aminoanthraquinone being formed is isolated by blowing air through the reaction mixture, filtering and washing.

Likewise, 2-aminoanthraquinone may be obtained from anthraquinone-2-pyridinium chloride, when boiling the latter with dilute caustic soda solution, advantageously with the addition of ethylalcohol.

Example 3

10 parts of anthraquinone- 1,5-dipyridinium dichloride or -dibromide are dissolved in 200 parts of water, 50 parts of piperidine are added and the reaction mixture is boiled, until all of the starting material has disappeared. After cooling, 1,5-diaminoanthraquinone separates in a very pure state and in form of fine crystals.

In an analogous manner 2,6-diaminoanthraquinone may be obtained from anthraquinone-2,6-dipyridiniumdichloride or -dibromide, whereby advantageously a mixture of piperidine and pyridine is applied instead of piperidine itself.

Example 4

5 parts of 1-aminoanthraquinone-4-pyridinium chloride are boiled in a mixture of 150 parts of water and 25 parts of piperidine for about 10 minutes. After cooling, the 1,4-diaminoanthraquinone being formed separates.

Example 5

3 parts of 1,5-diaminoanthraquinone-4-pyridinium chloride are boiled, while stirring, in a mixture of 20 parts of aniline and 3 parts of anhydrous potassium acetate. After cooling, the reaction mixture is filtered and the residue washed with alcohol and water. 1,4,5-triaminoanthraquinone is thus obtained in a well crystallized form and in a good state of purity.

Example 6

5 parts of anthraquinone-1-pyridinium chloride are boiled in 250 parts of an about 2% aqueous sodium carbonate solution, until the formation of brownish-violet crystals no longer increases. A water insoluble compound is thus obtained, containing the same number of carbon atoms and having most probably the structure as given in the Formula I. It dissolves in pyridine with a pure red, in concentrated sulfuric acid with a yellowish brown coloration, and it can be transformed into 1-aminoanthraquinone by boiling it with aqueous piperidine.

Example 7

1-aminoanthraquinone-4-pyridinium chloride is introduced at 50° C. into a 1% caustic soda solution and the mixture is stirred at that temperature for half an hour. A dark compound separates, which is filtered, washed and crystallized from pyridine. It dissolves in pyridine with an intensely greenish-blue coloration and in concentrated sulfuric acid with a brownish-yellow coloration. The new compound most probably corresponds to the formula:—

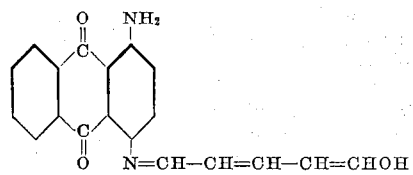

Example 8

20 parts of the picrate of the benzanthronyl-Bz-1-pyridinium compound are suspended in 80 parts of hot alcohol, 40 parts of piperidine are added and the mixture is boiled for some minutes. To the reddish-brown solution thus obtained 140 parts of 30% hydrochloric acid are added, whereafter an intermediate product separates in nearly colorless microscopically small needles. These needles are filtered, washed with water, pasted with alcohol and then boiled with dilute caustic soda solution. The intermediate product first becomes dark and then turns to a light brownish-red compound, which most probably is benz-1-amino-benzanthrone. It is obtained in a very pure form and melts after crystallization from pyridine at 240° C. (uncorrected).

Example 9

Anthanthrone-2,7-dipyridinium dichloride is boiled with dilute caustic soda solution with the addition of a small amount of piperidine. A dark product separates, which is treated with an alkaline aqueous sodium hydrosulfite solution, until a violet vat is formed. Air is then blown through the vat or hydrogen peroxide is added to the same, whereafter a nearly black compound separates which most probably is 2,7-diaminoanthanthrone. It difficultly dissolves in boiling nitrobenzene with a bluish-green coloration and in concentrated sulfuric acid with a red coloration.

Example 10

10 parts of 9-chloroanthracene-10-pyridinium chloride are boiled in a mixture of 20 parts of ethylalcohol and 6 parts of piperidine, until light orange six-sided prisms separate. The precipitation of these prisms is completed by the addition of ethylether. The compound thus obtained is probably 9-chloro 10-aminoanthracene. It dissolves in cold concentrated sulfuric acid with a yellowish-red coloration, which brightens at higher temperatures and melts at 156° C. (uncorrected). The new compound can be acetylated by means of acetic acid anhydride.

Example 11

5 parts of anthraquinonel-pyridinium chloride are dissolved in 100 parts of water and to this solution 30 parts of a 25% aqueous ammonia solution is added at a temperature of 90° C. A brown vat is formed, which is stirred at the air at a temperature of 90° C., until olive yellow needles have separated. The compound thus obtained dissolves in boiling pyridine with a brown coloration, in cold concentrated sulfuric acid with a brownish-red coloration. When heating the sulfuric acid solution its color becomes orange yellow with a greenish-yellow fluorescence. After drying at 100° C. the new compound dissolves in concentrated sulfuric acid with a brownish-yellow coloration without fluorescence.

When treating anthraquinone-2-pyridinium chloride as described in the above example, there is formed without the formation of a vat a compound dissolving in concentrated sulfuric acid with a dark blue, in pyridine with a yellowish-brown coloration.

Example 12

4 parts of the pyridinium salt of 1-amino-2,4-dibromoanthraquinone (obtainable by heating a mixture of 10 parts of 1-amino-2,4-dibromoanthraquinone with 30 parts of aluminium chloride and 27 parts of pyridine to about 150° C.) are introduced into 120 parts of a 16% aqueous piperidine solution. The mixture is boiled while stirring, until the separation of dark blue needles does no longer increase. The new compound dissolves in concentrated sulfuric acid with a yellow coloration and forms a chloride difficultly soluble in dilute hydrochloric acid, soluble in water with a dark violet coloration. The chloride dyes tanned cotton strong violet shades. The constitution of the new compound which contains 3 nitrogen atoms on one anthraquinone molecule is unknown up-to-date.

We claim:—

1. The process which comprises reacting upon a pyridinium halogenide having attached to the nitrogen atom a radical of a polycyclic organic compound containing at least three nuclei with an alkaline reacting agent other than a tertiary heterocyclic base.

2. The process as claimed in claim 1, in which a primary or secondary amine is applied as the alkaline reacting agent.

3. The process as claimed in claim 1, in which an alkaline reacting agent selected from the group consisting of piperidine and water soluble inorganic alkaline reacting agents is applied.

4. The process which comprises reacting upon a pyridinium halogenide having attached to the nitrogen atom a radical of a polycyclic organic compound containing at least three nuclei with an alkaline reacting agent other than a tertiary heterocyclic base at a temperature between about 40 and about 200° C.

5. The process as claimed in claim 4, in which a primary or secondary amine is applied as the alkaline reacting agent.

6. The process as claimed in claim 4, in which an alkaline reacting agent selected from the group consisting of piperidine and water soluble inorganic alkaline reacting agents is applied.

7. The process for the manufacture of 2,6-diaminoanthraquinone, which comprises boiling a compound of the formula:—

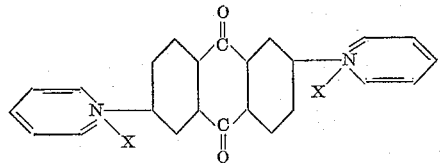

wherein X means chlorine or bromine with aqueous piperidine for about half an hour.

8. The process for the manufacture of 9-chloro-10-aminoanthracene which comprises boiling 9-chloro-anthracene-10-pyridiniumchloride with a mixture of piperidine and water or alcohol for some minutes.

9. The process for the manufacture of 1,4,5-triaminoanthraquinone, which comprises boiling a compound of the formula:—

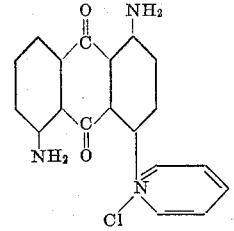

with aniline in the presence of an anhydrous alkali metal acetate for some minutes.

WALTER MIEG.
RUDOLF M. HEIDENREICH.
HEINRICH NERESHEIMER.